Patented Nov. 11, 1952

2,617,785

UNITED STATES PATENT OFFICE 2,617,785

NOVOLAK RESIN PREPARATION

Eric George Kemp Pritchett, Solihull, and George Barnett, Olton, England, assignors, by mesne assignments, to Union Carbide and Carbon Corporation, a corporation of New York No Drawing. Application May 23, 1947, Serial No. 750,164. In Great Britain June 18, 1946

8 Claims. (Cl. 260—57)

This invention is for improvements in or relating to the preparation of novolak resins. Such resins are phenol-aldehyde resins which have no reactive groups (i. e. methylol groups) in the molecule and are incapable of condensing with other novolak molecules on heating except upon the addition of a hardening agent such as hexamethylenetetramine.

Novolak resins, unlike resols, are permanently fusible and the process for their manufacture can therefore be more accurately controlled with the consequent attainment of greater uniformity of product than is the case with resols. Further, predetermined properties may be imparted to novolaks with greater certainty and accuracy than to resols.

Novolak resins can generally be rendered heat-hardenable by incorporating a hardening agent, such as 5 to 15 per cent by weight of hexamethylenetetramine, and they are used in this form in moldable and abrasive compositions and other products in which the property of heat-hardening is advantageous. In some cases, however, such as with oil-soluble resins formed from substituted phenols, such as para-tertiary butyl phenol, it is usual to employ the permanently fusible resin without the incorporation of e. g. hexamethylenetetramine.

In the usual method of preparing novolak resins, a phenol, i. e. a monohydric phenol having two or more of the active nuclear positions (ortho, ortho and para to the phenolic hydroxyl), unblocked is heated with less than an equimolecular proportion of aqueous formaldehyde in the presence of a small proportion of an acid catalyst and the mixture is then dehydrated until the product, when cooled, is a hard fusible resin. A drawback to this method of manufacture is the protracted period during which the initial reaction must be continued, frequently of the order of 6 to 12 hours, to ensure that the minimum amount of formaldehyde remains unreacted.

It is an object of the present invention to prepare a novolak resin having the advantageous characteristics outlined above, namely, uniformity of product, predetermined properties and easily controlled manufacture, but combined with a much shorter manufacturing time. A further object is to provide a simple and inexpensive process of making a novolak in relatively cheap and readily available apparatus.

According to the present invention, a process for the manufacture of a phenol-formaldehyde novolak resin comprises reacting one molecular proportion of a phenol with not more than 0.9 molecular proportion of formaldehyde in the presence of an alkaline catalyst until substantially all the formaldehyde has combined, acidifying the reaction mixture with an amount of acid in excess of that amount below which a rubbery resin is subsequently formed and dehydrating the reaction mixture.

In some instances it may be advisable to continue the reaction after acidification and before dehydration, and particularly when employing only a small excess of acid.

The alkaline reaction may be carried out at room temperatures or at elevated temperatures. At higher temperatures, for instance, when the reaction mixture is refluxed, it is important that the reaction should not be prolonged substantially beyond the point at which the formaldehyde has all reacted in order that the tendency to form rubbery masses after acidification may be avoided. At room temperatures the extent to which the alkaline reaction is prolonged is not so critical because at lower temperatures the reaction, subsequent to the formation of phenol alcohols is extremely slow. The low temperature alkaline reaction may be carried out in simple vats or digesters and provides a means of effecting the initial reaction in bulk in simple and relatively inexpensive apparatus. The subsequent dehydration step may be carried out in stills of conventional design or in any suitable drying equipment.

Inorganic bases such as sodium hydroxide or calcium hydroxide are particularly suitable catalysts, but organic bases such as dimethylamine and piperidine may be used. Salts (e. g. carbonates) having alkaline reaction may also be used.

If the proportion of formaldehyde is increased beyond the ratio given above novolak resins are not obtained. When a small excess of formaldehyde is used, rubbery resins are formed and with a larger excess of formaldehyde beyond 0.9 mol formaldehyde per mol of phenol resols are obtained. There is no lower limit of formaldehyde to be observed. Thus, if considerable excess of phenol is employed the excess is largely eliminated in the dehydration stage, but the melting point of the resultant resin may be somewhat low because of the presence of residual free phenol.

The pH value to which the resin is adjusted during the acidification varies not only with the particular phenol employed but also with the proportion of phenol to formaldehyde in the reaction mixture. The maximum permissible pH value to obtain a novolak resin decreases with increase in formaldehyde ratio.

The pH value may be conveniently determined by means of a glass electrode with calomel half-cell. When the reaction mixture is homogeneous, as when phenol is employed, the pH value may be directly determined on the reaction mixture, but when the reaction mixture separates into two phases, as when butyl phenol is used, the pH value may be determined on the aqueous phase.

When using a strong alkali with a weak acid or a weak base with a strong acid then the buffering action of the salts formed should be taken into account when acidifying. Under such circumstances the pH value measured at room temperature is not necessarily a guide to the pH value at the temperature of the reaction. In practice it is found that acid must be added in at least the chemical equivalent of the base used.

Examples of maximum pH values for phenol and cresol with variations in the formaldehyde content of the reaction mixture and with strong alkalis and strong acids are given below:

PHENOL

| Mols of formaldehyde per mol. phenol | Maximum pH value |
|---|---|
| 0.80 | 2.2 |
| 0.90 | 1.8 |

CRESOL (52-53% META-CONTENT)

| | |
|---|---|
| 0.52 | 4.8 |
| 0.56 | 4.1 |
| 0.60 | 3.5 |
| 0.65 | 2.6 |
| 0.70 | 1.9 |

The present invention also includes a heat-hardenable resinous composition comprising a novolak resin prepared as described above admixed with a hardening agent such as hexamethylenetetramine with or without a filler.

Following is a description by way of example of methods of carrying the invention into effect:

Example I

A mixture of 1,000 grams of phenol and 700 grams of aqueous formaldehyde (37 per cent by weight formaldehyde) is refluxed together with 25 ml. of 5 N sodium hydroxide for 35 minutes. Sufficient hydrochloric acid is added to give a pH value of 1.20 (about 29.5 ml. of 5 N HCl is required). The mixture is then dehydrated under atmospheric pressure until a hard resin is obtained having a melting point of 75° C. as determined by the capillary tube method.

Example II

A mixture of 1,000 grams of cresol (52 per cent meta content) and 452 grams aqueous formaldehyde (37 per cent by weight formaldehyde) is refluxed for 20 minutes with 10 ml. of 5 N NaOH. Sufficient hydrochloric acid (about 12.8 ml.) is added to adjust the pH to 3.0 and the mixture is refluxed for a further 170 minutes. The mixture is dehydrated at atmospheric pressure until a hard resin is formed having a melting point of 60° C. when determined by the capillary tube method.

Example III

A mixture of 1,200 grams para-tertiary-amyl phenol and 480 grams aqueous formaldehyde (37 per cent by weight formaldehyde) is heated for 10 minutes to melt the phenol. A solution of 12 grams of sodium hydroxide in 60 ml. water is added and the mixture refluxed for 15 minutes. A solution of 18 ml. of concentrated $H_2SO_4$ (S. G. 1.84) in 40 ml. of water is added giving a pH value of 0.60 and the mixture refluxed for a further 60 minutes. The resin is washed three times with water and dehydrated at atmospheric pressure until a hard resin is formed having a melting point of 80° C. as determined by the capillary tube method.

Example IV

A mixture of 800 grams phenol and 616 grams aqueous formaldehyde (37 per cent by weight formaldehyde) and 40 ml. ammonium hydroxide (S. G. O. 910) is refluxed for 30 minutes after which period the formaldehyde content of the reaction mixture should be less than 1 per cent. Hydrochloric acid (about 80 ml. 5 N HCl) is added. The pH of this mixture at room temperature is about 0.6. The mixture is refluxed for a further 40 minutes and evaporated to 150° C. to form a brittle resin melting at 78° C.

Example V

A mixture of 200 grams phenol and 140 grams aqueous formaldehyde (37 per cent by weight formaldehyde) and 2 grams magnesium oxide is refluxed for 10 minutes after which period the formaldehyde content of the reaction mixture should be less than 1 per cent. Hydrochloric acid is added to a pH of 0.7 (about 22 ml. 5 N HCl). The mixture was refluxed for a further 30 minutes and evaporated at atmospheric pressure to 150° C. to form a brittle resin melting at 70° C.

What is claimed is:

1. Process according to claim 8 in which the alkaline catalyst comprises a strong inorganic base.
2. Process according to claim 8 in which the alkaline catalyst comprises sodium hydroxide.
3. Process according to claim 8 in which the alkaline catalyst comprises calcium hydroxide.
4. Process according to claim 8 in which the acid is added in at least the chemical equivalent of the base catalyst.
5. Process according to claim 8 in which the acid is a strong inorganic acid.
6. Process according to claim 8 in which the condensing catalyst is a strong alkali and the acidifying agent a strong inorganic acid.
7. Process according to claim 8 in which the reaction mass is acidified to a pH value substantially between 0.6 and 4.8.
8. Process of preparing a novolak phenol-formaldehyde resin which comprises forming a reaction mixture of a molar amount of a monohydric phenol having two or more unblocked active nuclear positions and up to 0.9 mol aqueous formaldehyde, reacting said mixture in the presence of an alkaline catalyst but not substantially beyond the point where all of the formaldehyde is combined with the phenol, acidifying the aqueous reaction mass by the addition of an acid in excess of an amount which would cause a rubbery resin to be formed, and then dehydrating the acidified reaction mass.

ERIC GEORGE KEMP PRITCHETT.
GEORGE BARNETT.

REFERENCES CITED

The following references are of record in the file of this patent:

UNITED STATES PATENTS

| Number | Name | Date |
|---|---|---|
| 1,614,171 | Amann et al. | Jan. 11, 1927 |
| 1,437,726 | Croad et al. | Dec. 5, 1942 |

OTHER REFERENCES

Carswell: Phenoplasts (page 33), pub. by Interscience Publishers Inc., N. Y. (1947).

Niederl et al.: Jour. Amer. Chem. Soc., vol. 67, pp. 1176–8 (1945).

Koebner: Chem. Ztg., vol. 54, page 619 (1930).